United States Patent [19]

Patteson

[11] Patent Number: 4,568,288

[45] Date of Patent: Feb. 4, 1986

[54] SYSTEM AND A METHOD TO VISUALLY SIMULATE SUBSYSTEMS IN A FOSSIL FUEL POWER PLANT SIMULATOR

[75] Inventor: Michael W. Patteson, Crofton, Md.

[73] Assignee: The Singer Company, Silver Spring, Md.

[21] Appl. No.: 536,267

[22] Filed: Sep. 27, 1983

[51] Int. Cl.[4] .............................................. G09B 25/02
[52] U.S. Cl. .................................... 434/366; 434/219; 434/307
[58] Field of Search ............... 434/307, 366, 219, 224; 272/8 F, 15

[56] References Cited

U.S. PATENT DOCUMENTS

| | | | |
|---|---|---|---|
| 3,146,533 | 9/1964 | Carmody et al. | 434/366 |
| 3,237,318 | 3/1966 | Schager | 434/219 |
| 3,451,147 | 6/1969 | Mehlig et al. | 434/366 X |
| 4,060,915 | 12/1977 | Conway | 434/307 |
| 4,107,854 | 8/1978 | Bougon | 434/20 |
| 4,173,777 | 11/1979 | Schmit et al. | 362/253 |
| 4,210,964 | 7/1980 | Rogers et al. | 364/578 |

Primary Examiner—William H. Grieb
Attorney, Agent, or Firm—Charles B. Malandra

[57] ABSTRACT

A simulation system for a fossil fuel power plant simulator. The simulation system includes first, second, and third displaying means for respectively displaying selected simulated flame characteristics within the furnace, emission density images from the smokestack, and water/steam levels as indicated by a steam drum level indicator of the power plant. A computer correlates the images displayed on the first, second, and third displaying means such that a change in the operating level of the power plant causes corresponding changes in the simulated flame characteristics, emission density images, and water/steam level.

33 Claims, 10 Drawing Figures

SYSTEM AND A METHOD TO VISUALLY SIMULATE SUBSYSTEMS IN A FOSSIL FUEL POWER PLANT SIMULATOR

FIELD OF THE INVENTION

This invention relates to simulators for the control room of fossil fuel power plants. More specifically, this invention relates to visual simulation of smokestack emission, furnace flame, and steam drum level.

BACKGROUND OF THE INVENTION

Simulation devices have been used for many years for operator training and procedure definition. In particular, simulators for power plant control rooms including plant specific replicas of control consoles for nuclear and fossil fuel power plants are developed either when a new plant is being installed or the plant owner requires simulator training for its operators. An effort is made to make each simulator as realistic as possible so that operators for the actual plant can be trained in normal operating procedures and can learn to react to abnormal plant conditions.

The power plant control room simulators are usually computer-controlled with the computer interfacing with the control console to control meters, switches, and lights on the console in a manner mimicking the operation of an actual power plant. Thus, by appropriately programming the computer, operators can be trained in all aspects of plant operation in real time.

Both nuclear and fossil fuel power plants are far too expensive, complicated, and potentially hazardous to permit on-the-job training. The transition of a plant from start-up through partial and full operation takes a considerable amount of time and is an expensive process. It is too expensive to start up and shut down a plant simply for the purposes of operator training. In addition, operators must be trained to recognize and to respond to malfunctions and emergency conditions. It is far too hazardous both to surrounding communities and personnel and to the physical plant to duplicate emergency conditions in a real time manner for training purposes. Thus, it is important that realistic simulators be developed to train operators thoroughly when possible in advance of plant completion or to retrain operators periodically.

There are many areas in a fossil fuel power plant which must be under continual monitoring and, therefore, it is important to simulate these areas. Among these are the flame characteristics in the actual furnace or firebox of the power plant, the water level in the steam drum associated with a power plant, and visible emissions given off by the power plant.

The flame characteristics in a furnace or firebox is an important indicator of the stability of a fossil fuel power plant. The furnaces are designed to support an evenly distributed fireball with complete combustion of the fuel. In addition, in a fossil fuel plant, the furnace can include multiple levels of associated igniters and fuel supplies. For example, a fossil fuel power plant may have three levels of fuel supplies or inlets with each level including one or more oil igniters and oil supply guns for raising the temperature of the furnace to the optimum level for efficient combustion of the particular type of coal being burned in the plant. The ignition of the oil from the various oil supply guns and the results of adding coal to the furnace all have associated normal visual effects. For example, initially the interior of the furnace is black and the ignition of the oil from the various oil supply guns resembles a sequence of torch flames appearing against the black background of the furnace. The flame pattern has specific characteristics including a swirling motion due to updraft of the furnace. The igniters are normally lit and the corresponding oil supply guns are normally opened in a predetermined sequence progressing from the lower or first level upward through the various levels in the furnace before any coal is added. The purpose of the igniters and oil supply guns is to raise the temperature of the furnace and to provide flame stability at low firing.

Many of the furnaces of actual fossil fuel power plants include a video camera located in the furnace above the igniters and fuel inlets. The camera transmits video images of the firebox to the control console of the plant to enable the plant operator to inspect the flame in the firebox visually. The use of a video camera, however, has not proved entirely satisfactory because carbon and other emissions given off during combustion accumulate on the camera lens with the result that the visual images become less distinct and finally can no longer be obtained. Such cameras are then rendered essentially useless until the power plant is shut down for cleaning at which time the lenses are cleaned and the cycle restarted.

Since it has proved exceedingly difficult to get video images of a firebox in operation, fossil fuel power plant simulators have not included visual simulation of the firebox. Also, if the plant operators must be trained in advance of startup of the actual power generation it may not be possible to use the in-plant camera to take training pictures.

Another condition of a fossil fuel power plant which is closely monitored is smokestack emission. The smokestack emissions serve as barometers with regard to the efficiency of the operation of the power plant and are affected by changes in the content of the fuel as well as by changes in the combustion environment within the firebox. Such changes in the firebox can result from faulty igniters, oil supply guns, or fuel feeds.

The emission content also depends upon the type of pollution equipment and the effectiveness of the pollution equipment used in conjunction with the power plant. Thus, a fossil fuel power plant will normally be equipped with scrubbers, precipitators, etc., to remove noxious gases and particulate material from the emissions from the smokestack. Generally speaking, the more opaque the emission plume given off by the smokestack the more likely that the emissions are harmful and that some corrective measure must be taken. A trained operator can determine abnormal operating conditions merely by visually inspecting the plume of the smokestack.

In actual fossil fuel power plants, it has been common for mirror or periscope systems to be used to view the plume of the power plant from the control console. More recently, television monitors with a camera aimed at the top of the smokestack have been used to provide visual images of the plume to the operators at the control console. It has not been the practice, however, to provide such visual images of the emissions of the smokestack in a control console of a simulator of a fossil fuel power plant. This, in part, is the result of the expense and risk of creating abnormal conditions in the firebox of the power plant to provide a range of emission patterns sufficient to provide a meaningful training vehicle for power plant operators. It simply cannot be justified to discharge noxious material from a smokestack of a power plant merely to obtain a visual recording of what such noxious emissions actually look like.

Another condition which is extremely important to the safe and efficient operation of a fossil fuel power plant is the water level in the steam drum. When the power plant is in a shut-down condition, the steam drum is, like the rest of the plant, cold and as a result, the drum contains only water. As the power plant is brought into operation and becomes fully operable the water in the steam drum is heated significantly with the result that steam is generated within the drum. The steam is dried and supplied to a turbine to generate power.

Most steam drums have an optimal level for the water/steam interface. In other words, the volume of water within the steam drum should not exceed a particular range in order to insure safe and efficient operation. If the water within the steam drum becomes sufficiently hot such that it all turns to steam then an extremely dangerous situation could result, such as massive wall failure causing major safety hazards to personnel and to the power plant itself.

As a result of the importance of the level of water/steam interface in the steam drum, the steam drum comes equipped with a steam drum level indicator which functions as a second indication for the operator's use. In an actual power plant, the steam drum level indicator has been viewed either directly by personnel located away from the control console or by personnel at the console through mirrors or periscopes. In any event, fossil fuel power plant simulators have not included the facility for simulating the video monitored level indicator of the steam drum. Thus, it has not been possible to visually demonstrate the effect changes in operating parameters of the power plant, e.g., changes in the fuel supply to the firebox, will have on the water level in the steam drum. This has resulted in operators being insufficiently trained to recognize dangerous conditions in the steam drum.

OBJECTS AND SUMMARY OF THE INVENTION

It is an object of the present invention to visually simulate the effect of changes in the combustion level of a power plant on the emissions given off by the power plant and the level of water in a steam drum associated with the power plant.

Another object of the present invention is to visually simulate the combustion chamber of a fossil fuel power plant.

Yet another object of this invention is to improve the training of fossil fuel power plant operators by including in a simulator visual simulation of the emissions given off by a power plant, the water level in a steam drum, and the flame characteristic in the combustion chamber.

Still another object of the present invention is to provide a simulator capable of more thoroughly training fossil fuel power plant operators in real time.

These and other objects are accomplished by a fossil fuel power plant control room simulator having a simulation system that includes the visual simulation of a smokestack, a steam drum indicator, and a firebox with a plurality of alternating levels of flame sources. The simulation system comprises a first displaying means, a first video recorder for storing simulated firebox images including different ones of the flame sources being operative for different levels of operation of the power plant and for supplying the stored firebox images to the first displaying means, and means for controlling the first displaying means to display selected sequences of the stored simulated firebox images to show on the first displaying means simulated visual changes in the firebox corresponding to the changes of the simulated power plant from one operation level to another.

The simulation system of the present invention further includes a second displaying means and a second video recorder for storing simulated emission density images superimposed on an image of the smokestack and for supplying the simulated emission density images to the second displaying means. The second video recorder is controlled by the controlling means to supply to the second displaying means the simulated emission density images corresponding to the simulated firebox images being displayed by the first displaying means.

As yet a further feature of the present invention, the simulation system includes a third displaying means and a third video recorder for storing simulated water/steam level images of a steam drum level indicator simulating different levels of water/steam within a steam drum associated with the power plant. The third video recorder supplies the water/steam level images to the third displaying means in a sequence to simulate the effect the simulated operation level of the power plant has on the water/steam level in the steam drum.

BRIEF DESCRIPTION OF THE DRAWINGS

The accompanying drawings which are incorporated in and constitute a part of the specification, illustrate an embodiment of the invention and, together with a description, serve to explain the principles of the invention.

DETAILED DESCRIPTION OF THE PREFERRED EMBODIMENT

Figures 1, 2, 8:
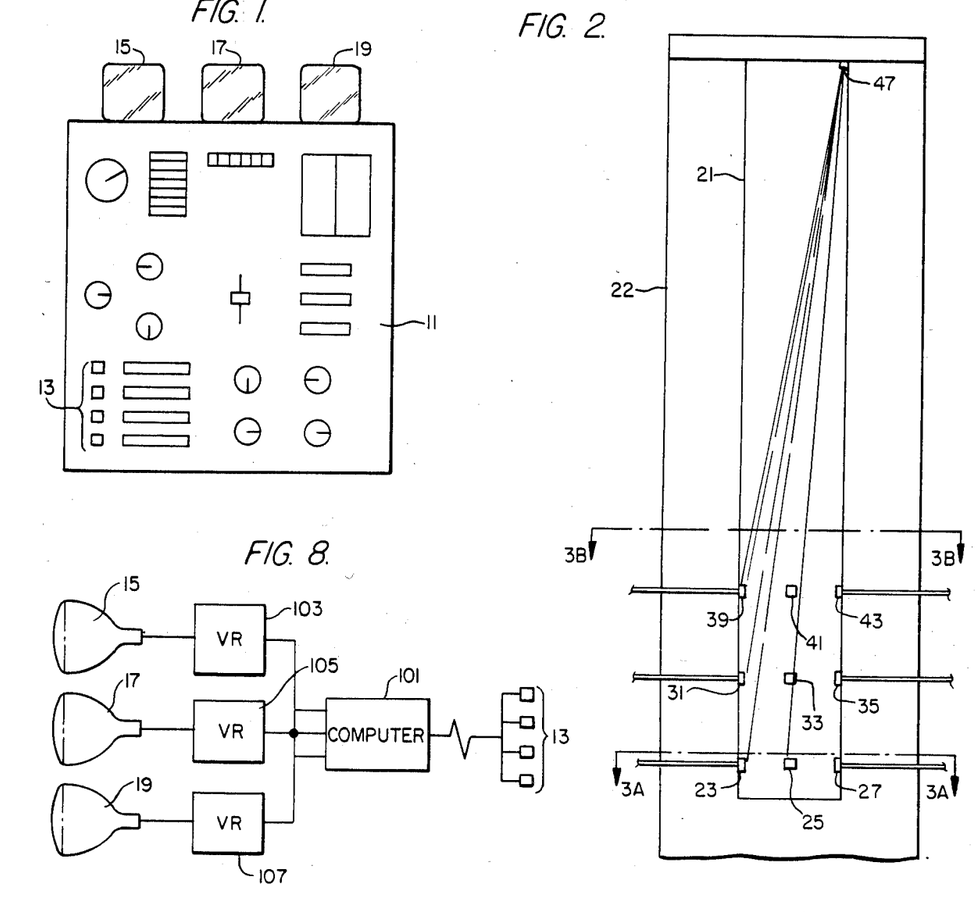
FIG. 1 is a schematic illustration of a control console of a simulator which includes the simulation system of the present invention.
FIG. 2 is a schematic, cross-section of a furnace of a fossil fuel power plant, the operation of which is partially simulated by the simulation system of the present invention.
FIG. 8 is a schematic illustration of the simulation system of the present invention incorporating the images of the furnace flame, steam drum level, and smokestack emission produced in FIGS. 4, 6, and 7.

FIG. 1 is a schematic illustration of a portion of the simulation system of the present invention. In particular, FIG. 1 illustrates a control console 11 of a simulator for a fossil fuel power plant. As seen in FIG. 1, the control console 11 includes dials, gauges, readouts, and a plurality of simulator switches 13. These dials, gauges, readouts, and switches are exact replicas of corresponding elements in the control console of the actual fossil fuel power plant being simulated. The switches on the control console of the actual power plant are used to select operation levels for the fossil fuel power plant and, therefore, the switches 13 on the control console 11 are used in the simulator to initiate and control the operation level to be simulated by the fossil fuel plant simulator.

The control console 11 includes three displays 15, 17, and 19 within easy viewing distance of an operator monitoring the control console 11. The display 15 is used to display simulated images of a firebox of a fossil fuel power plant. The display 17 displays simulated images of emissions given off by the smokestack of a fossil fuel power plant. Finally, the display 19 displays simulated images of a steam drum level indicator which is used in connection with a fossil fuel power plant.

FIG. 2 is a schematic illustration of the furnace of a fossil fuel power plant. The furnace 21 is vertically suspended within an enclosure 22 to accommodate the thermal expansion and contraction of the furnace 21 as its temperature changes.

It is common for a furnace to include a plurality of alternate levels of flame sources, preferrably igniters, oil supply guns, and fuel inlets. As shown in FIG. 2, the furnace 21 includes three levels of igniters, oil supply guns, and fuel inlets. A first level includes flame sources 23, 25, 27, and 28 (not shown) that preferably include igniters, oil supply guns, and fuel inlets. The oil supply guns and igniters are selectively activated when the power plant is rendered operative. Such activation produces oil sprayed out from the oil supply guns and ignited by the igniters. The level one fuel inlet, connected to a pulverizer, supplies pulverized coal or other fuel to the furnace at the level one flame sources 23, 25, 27, and 28. The pulverized fuel is not introduced into the furnace 21 until the boiler loading is sufficiently high enough for efficient combustion of the pulverized fuel.

A second level of flame sources 31, 33, 35, and 36 (not shown) is provided. The second level of flame sources includes igniters, oil supply guns, and fuel inlets. The second level igniters and oil supply guns are selectively activated, normally after the activation of the first level of igniters and oil supply guns to further heat the furnace in anticipation of the introduction of pulverized fuel. The pulverized fuel is introduced at the second level in the furnace 21 at the second level flame sources 31, 33, 35, and 36 (not shown).

A third level of flame sources 39, 41, 43, and 44 (not shown) is provided within the furnace 21. The third level of flame sources include igniters, oil supply guns, and fuel inlets. The igniters and oil supply guns of the third level are normally activated after the activation of the first and second level igniters and oil supply guns and before the introduction of pulverized fuel. The third level fuel inlets are provided to introduce fuel into the furnace 21 at the appropriate time. One of ordinary skill in the art would realize that the furnace 21 could include a different number of levels of igniters, oil supply guns, and fuel inlets depending upon the design and the anticipated capacity of the furnace 21.

Figure 3A:
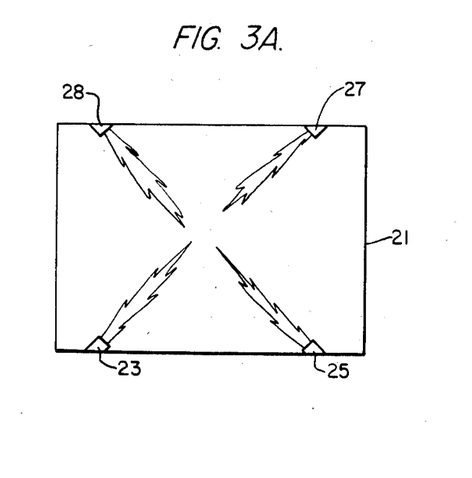
FIGS. 3A and 3B are schematic illustrations of igniters, oil supply guns, and fuel inlets at a certain level in the fossil fuel power plant furnace illustrated in FIG. 2.

FIG. 3A is a cross-sectional view of the furnace 21 of FIG. 2 taken along the line 3A—3A. FIG. 3A illustrates the four, level one flame sources 23, 25, 27, and 28 at the time the four oil supply guns have been ignited. In the furnace of FIG. 2, the oil supply guns are located close to the four corners and each includes a nozzle for directing a flame toward the center of the furnace 21. As will be hereinafter described, the flame pattern of the ignited oil supply guns is affected by the draft within the furnace 21 and in normal operation will resemble a swirling pattern.

Figure 3B:
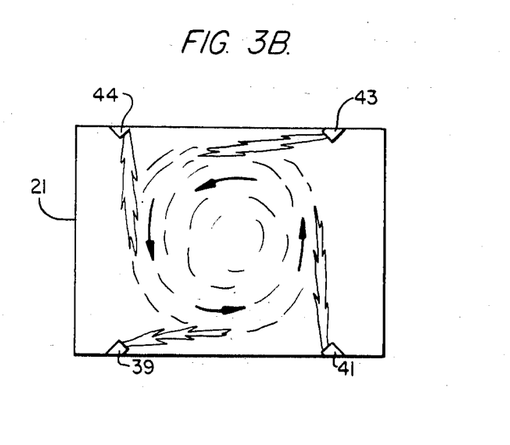

FIG. 3B is a cross-section of the furnace 21 of FIG. 2 taken along the line 3B—3B. FIG. 3B illustrates the swirling pattern of gases and fuel within the furnace 21 after the introduction of fuel from one or more levels of fuel inlets.

FIGS. 3A and 3B are provided to illustrate characteristic flame patterns within an operating furnace 21. A purpose of the monitor 15 (FIG. 1) and the simulator of the present invention is to enable the visual simulation of the flame pattern within the furnace 21 of an operating fossil fuel power plant. In an actual power plant the monitor 15 is supplied with video images of the firebox from a camera 47 until such time as the camera 47 becomes ineffective due to carbon and other deposits on its lens.

Figures 4, 6, 7:
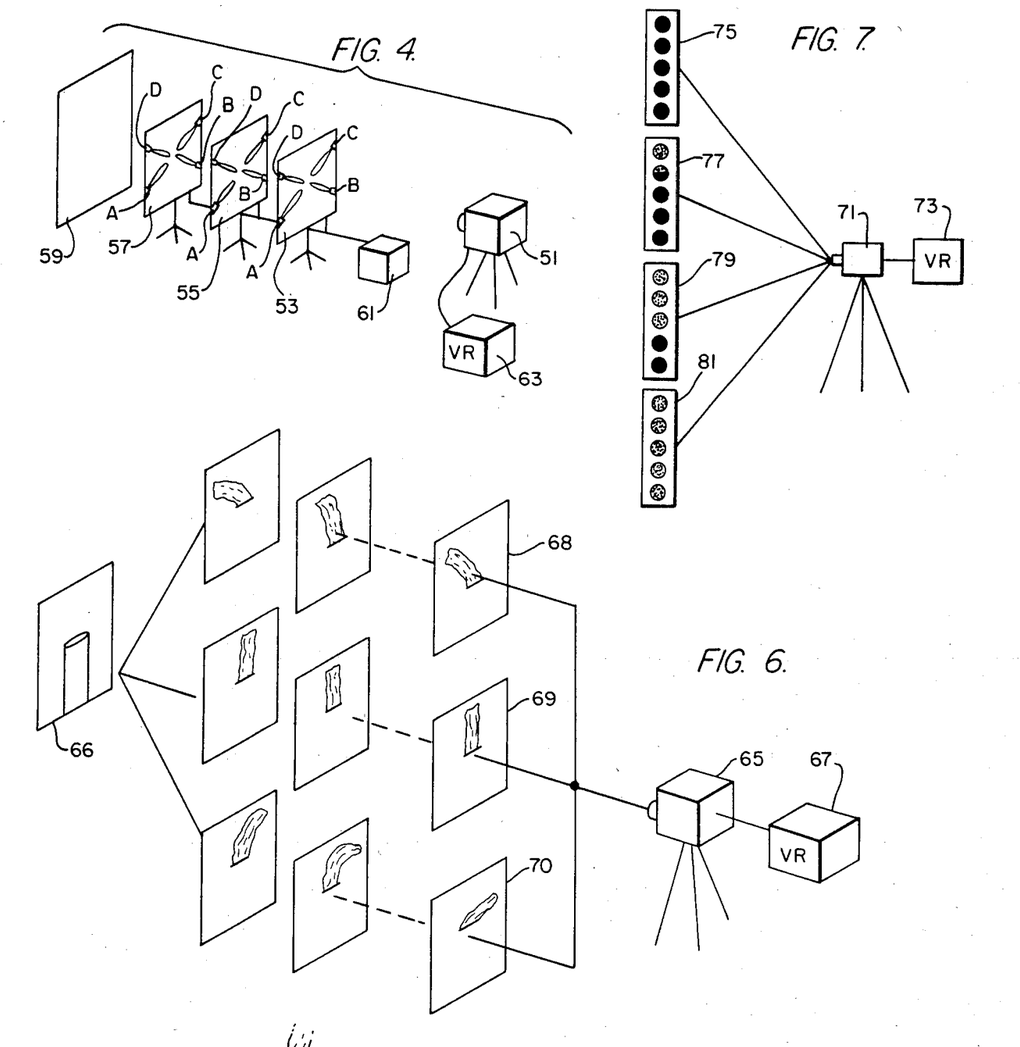
FIG. 4 schematically illustrates a device for generating firebox flame images for visual recording and use in the simulation system of the present invention.
FIG. 6 is an illustration of a procedure for producing and recording video images of simulated emissions from the smokestack of the fossil fuel power plant shown in FIG. 5.
FIG. 7 illustrates a procedure for producing and recording simulated visual images of a steam drum level indicator for use in the simulation system of the present invention.

FIG. 4 illustrates the apparatus and a procedure for generating simulated visual images of flame patterns for different operational levels in the furnace 21. A camera 51 is connected to a video recorder 63 and is aimed at a series of supports 53, 55, and 57. A background 59 is provided behind the last support 57 and is preferably black to simulate the appearance of the interior of the furnace 21 during shutdown or following an abnormal termination of operation.

The support 53 comprises tubing bent to conform to the shape of the furnace to be simulated. As shown in FIGS. 2, 3A, and 3B, the furnace to be simulated is substantially rectangular, and therefore, the support 53 comprises tubing bent into a substantially rectangular shape. The support 53 includes jets or nozzles A, B, C, and D attached to the support in the same orientation as the level one igniters of the furnace 21. The nozzles A, B, C, and D correspond to the flame sources 23, 25, 27, and 28, respectively, shown in FIG. 3A.

The tubular support 55 is similarly rectangular in shape and includes nozzles A, B, C, and D located in the same orientation as the flame sources 31, 33, 35, and 36, respectively, of level two of the furnace 21. The support 57 comprises tubing bent in a substantially rectangular shape and includes nozzles A, B, C, and D located in the same positions as the flame sources, 39, 41, 43, and 44, respectively, of the third level of the furnace 21.

A fuel source 61 is connected to each of the tubular support members 53, 55, and 57. It has been found that an acetylene gas generates flame patterns similar to the flames of the actual igniters of the different levels of the furnace 21. The fuel from the fuel source 61 is ignited at the nozzles attached to the support members 53, 55, and 57.

The camera 51 is operated to generate simulated firebox images corresponding to the ignition and subsequent burning of the different oil supply guns in each of the three levels and to the addition of pulverized fuel as provided by the fuel inlets associated with the three levels in the furnace 21.

The simulated firebox images can be generated by lighting in sequence the nozzles A, B, C, and D of each of the support members 53, 55, and 57. The sequence selected corresponds to the sequence of ignition of the oil supply guns of the furnace 21 of the actual fossil fuel power plant. The firebox images are stored on a video recorder 63 for subsequent retrieval and reproduction on the display 15. The recorded image may be edited to enhance realism.

Thus, the apparatus of FIG. 4 enables the generation of simulated firebox images including images of different operating levels of the igniters, oil supply guns, and fuel inlets. In this instance, the effect of the fuel inlets is duplicated by inducing a draft through the support members 53, 55, and 57 and selecting the proper background 59 to resemble the firebox of the furnace 21 when pulverized fuel has been added.

Figure 5:
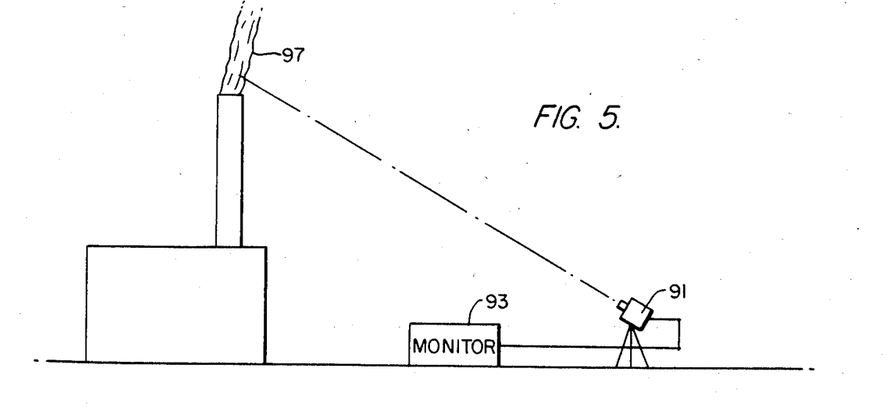
FIG. 5 is a schematic illustration of a smokestack emission monitoring device used in connection with fossil fuel power plants.

As stated above, it is common to monitor the emissions from the smokestack of a fossil fuel power plant. The monitoring is done using apparatus as shown in FIG. 5. A camera 91 is focussed on the plume 97 emitted from the smokestack of the power plant. The visual images are supplied to a monitor 93 which, in the real power plant, is located at the same position as the display 17 of the control console 11 of the simulator shown in FIG. 1.

An experienced operator of an actual fossil fuel power plant can determine valuable information concerning the operation of the plant merely by observing the visual characteristics of the plume 97. For example, during start-up of a cold fossil fuel power plant, the plume will change to reflect the ignition of the various levels of oil supply guns as well as the addition of pulverized fuel by the fuel inlets. During full operation of the plant, variations in the fuel are reflected in different visual characteristics of the plume 97. An operator upon seeing abnormal emissions within the plume 97 can take corrective measures by utilizing precipitators and other anti-pollution devices.

As stated above, the display 17 of the control console 11 is provided to display a visual simulation of emissions from the fossil fuel power plant at different levels of operation of the plant. The apparatus shown in FIG. 6 is capable of generating the simulated emission images for selective display on the display 17. As shown in FIG. 6, a video camera 65 is connected to a video recorder 67 and is aimed in the direction of a background image 66 corresponding to a photograph of the top of the actual smokestack of the power plant being simulated. The photograph of the smokestack can be taken during construction of the power plant or when the plant is in a shut-down condition i.e., no emissions from the smokestack.

The video camera 65 takes still photographs of the smokestack 66 through several sets 68, 69, and 70 of overlays. The set 68 of overlays comprises artistic reproductions of a plume emitted from a smokestack of the power plant to be simulated. Each overlay has a characteristic opacity level. By superimposing the overlays in the set 68, and by taking a still photograph of each superimposition, simulated emission images are generated with different levels of opacity.

This procedure is repeated for the sets 69 and 70 of overlays showing the plume in a slightly different orientation with respect to the smokestack on the background picture 66. Still photographs are taken of each opacity level created by superimposing the overlays within each set. The still images are recorded on the video recorder 67.

Multiple sets of overlays are used to permit simulation of movement of the plume with respect to the smokestack. Such movement duplicates the effect of wind on the smokestack plume and provides a more realistic simulation of the plume emitted from the smokestack.

The movement is simulated on replay of the still images recorded on the video recorder 67 by randomly or pseudorandomly alternating between sets 68, 69, and 70 of recorded images of like opacity and by selectively displaying images of different opacity. It will be understood that many combinations of plume opacity and movement can be generated by displaying selected sequences of the recorded emission images.

As stated above, it is common for a fossil fuel power plant to include a steam drum level indicator associated with the steam drum. Although there are several designs for steam drum level indicators, they have the common characteristic that a quick visual inspection enables an operator to determine the relative position of the water/steam interface within the steam drum. This visual information also enables a skilled fossil fuel power plant operator to determine characteristics of plant operation. If the water/steam interface is higher than expected, then either the operating level of the power plant is not at the selected level or there is some malfunction within the system. If the water/steam interface is below the expected level, then the operator will take steps to avoid a possible hazardous situation and may institute changes in the operating level of the power plant such as by reducing the level of operation of the furnace 21.

FIG. 7 illustrates an apparatus for generating simulated water/steam level images for a particular steam drum level indicator. The apparatus includes a video camera 71 and a video recorder 73 attached to the camera for recording images generated by the camera 71. A series of simulated images 75, 77, 79, and 81 of the steam drum level indicator are photographed by the camera 71 and are stored on the video recorder 73.

The simulated image 75 comprises a series of vertically aligned dark spots against a light background. This simulates the visual appearance of the actual steam drum level indicator when the steam drum level indicator is filled with water. In other words, water at a particular level in the steam drum corresponds to a dark spot at the same relative position on the steam drum level indicator.

The simulated steam level image 77 shows three lower dark spots, an upper spot having dark specks against a light background, and a circle which is partially black and partially filled with dark specks against a light background. An experienced operator seeing an image of a steam drum level indicator corresponding to the simulated image 77 would recognize that steam had been generated within the steam drum and that the water/steam interface was somewhere in the top half of the steam drum.

The simulated water/steam level image 79 of the steam drum level indicator shows the water/steam interface somewhere below the midpoint of the steam drum. Finally, the simulated water/steam level image 81 informs a trained operator that the steam drum was substantially filled with steam and possibly in a dangerous condition.

In actual practice, many additional simulated water/steam level images are photographed by the camera 71 and stored on the video recorder 73. The simulated water/steam level images are displayed on the display 19 of the control console 11.

The actual apparatus for displaying simulated flame characteristics, water/steam levels, and emission densities of a fossil fuel power plant is shown in FIG. 8. This apparatus includes means for displaying the sequences of simulated firebox images, including images of different operating levels of the igniters, oil supply guns, and fuel inlets of the furnace 21. As embodied herein, this display means comprises the display 15 and an associated video recorder 103 which plays the previously described firebox images generated and recorded by the camera 51 and the video recorder 63, respectively, as shown in FIG. 4.

The simulation system further includes means for displaying a visual simulation of emissions by the fossil fuel power plant at different levels of operation of the plant. As embodied herein, this display means comprises the display 17 and the video recorder 105 connected thereto. The video recorder 105 has stored therein the video images generated by the camera 65 and recorded by the video recorder 67 (FIG. 6).

The simulation system further includes means for displaying simulated water/steam level images of a steam drum level indicator to display simulated levels of water/steam in the steam drum. As embodied herein, this steam drum level display means comprises the display 19 and the video recorder 107. The video recorder 107 stores and selectively supplies to the display 19 the simulated images of the steam drum level indicator as described with respect to FIG. 7.

Means are provided for controlling the firebox image display means, emission display means, and the steam drum level display means to display their respective simulated images in a selected sequence. As embodied herein, the controlling means comprises a computer which is programmed in the normal manner for simulators to cause the gauges, dials, readouts, and switches on the control console 11 to operate in the manner of an actual fossil fuel power plant. The computer is further programmed to control the video recorders 103, 105, and 107, to select the appropriate video images, and to supply the selected images to the displays 15, 17, and 19 in a manner corresponding to the simulated operation level of the power plant. As embodied herein, the switches 13 select operating levels for the power plant and supply control signals to the computer indicating the operating level selected. The computer then controls the video recorders to supply appropriate simulation images, to coincide with the changing conditions existing in the simulator, which is operating in real time.

In operation, the simulated flame level, steam drum level, and emission density level images are generated and recorded as described with reference to FIGS. 4, 6, and 7. The simulated images are stored on the medium, such as a disc or tape, of the appropriate video recorder as shown in FIG. 8 to enable simulation of the different events occurring during the operation of an actual fossil fuel power plant. The video recorders 103, 105, and 107 can be implemented by Pioneer video disc machine model PR 7820 or any other device which permits the display of sequences of video images in a selected order.

For example, when an appropriate switch 13 is actuated to select the operation level of the power plant corresponding to the ignition of the level one oil supply guns, the simulated firebox images, which correspond to such an ignition sequence and are stored on the video recorder 103, are supplied to the display 15. In a preferred embodiment, a sequence of simulated images, e.g., images corresponding to the ignition of all four of the level one oil supply guns will be successively displayed in response to a single control signal from the computer 101. It is possible, however, to store each simulated image at an addressable location in the video recorder and for the computer 101 to transmit an address for each simulated image to be displayed.

After the sequence of simulated firebox images corresponding to the ignition of the level one oil supply guns has been displayed, the display 15 will continue to display simulation images corresponding to a firebox having four level one oil supply guns lit.

A switch 13 on the console level corresponding to ignition of the level two oil supply guns may then be activated by the operator, and the sequence of simulated firebox images corresponding to the ignition of the second level oil supply guns will be supplied by the video recorder 103 to the display 15.

At the time that the computer 101 responds to the selection of an operating level corresponding to ignition of the level one oil supply guns to cause the video recorder 103 to supply the appropriate firebox images to the display 15, the computer 101 controls the operation of the video recorders 105 and 107 to cause the display of corresponding simulated emission densities and steam drum levels, respectively.

Figure 9:
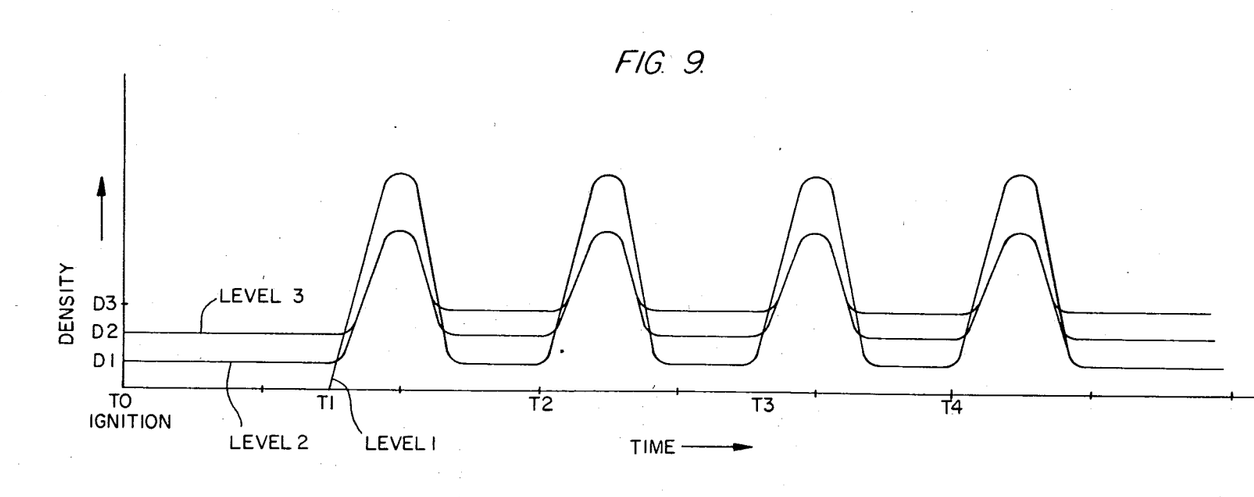
FIG. 9 is a timing diagram illustrating operation of the simulation system of the present invention.

For example, as shown in FIG. 9, assuming that a switch 13 is actuated at time T0 to commence a sequence of simulated images corresponding to the ignition of the level one oil supply guns, at time T1 the computer 101 transmits the appropriate control signals to the video recorder 105 to commence the display of simulated emission density images corresponding to emissions that would actually be given off by the level one oil supply guns in a fossil fuel power plant. As shown in FIG. 9, the times T1, T2, T3, and T4 correspond to the ignition of different ones of the oil supply guns in the same level of the furnace 21. At the ignition of each oil supply gun, the density of emission rises dramatically and then falls after the furnace temperature reaches stability after ignition. The ignition of the level two oil supply guns does not cause as high a rise in emission density as ignition of level one oil supply guns because of the sustained combustion in the furnace 21 from the level one oil supply guns. Similarly, ignition of the level three oil supply guns causes momentary increases in emission density with a return to a density level D3.

The computer 101 is similarly programmed to simulate a reaction in the steam drum to the increased temperature within the furnace 21. Accordingly, the computer 101 controls the video recorder 107 to display simulated water/steam level images showing an increasing steam level and a decreasing water level to simulate the operating temperature of the furnace 21.

It should be understood that the number of simulated images for flame characteristics, emission density, and steam drum level can vary according to the desired extent of simulation. Moreover, it is possible to generate the simulated firebox images in a manner different from that shown in FIG. 4. Similarly, the emission density and water/steam level images can be generated using apparatus different than that shown in FIGS. 6 and 7. It will be further apparent to those skilled in the art, that modifications and variations can be made to the simulation system of the present invention without departing from the scope or spirit of the invention and it is intended that the present invention cover the modifications and variations of a simulation system provided that they come within the scope of the appended claims and their equivalents.

What is claimed is:

1. A simulation system in real time for visually simulating a firebox of a fossil fuel power plant including a plurality of alternate levels of flame sources, the simulation system comprising:
   means for generating simulated firebox images corresponding to the firebox images of a particular fossil fuel power plant;
   means for displaying in real time sequences of simulated firebox images including images of different operating levels and characteristics of the flame sources; and
   means for controlling said displaying means to display selected sequences of said firebox images to simulate in real time the changes to the flame sources in the firebox caused by changes in the operation of a simulated power plant.

2. A simulation system according to claim 1 wherein said displaying means comprises:
   a cathode ray tube; and
   a video recorder for storing said sequences of simulated firebox images, said video recorder for supplying said firebox images to said cathode ray tube under the control of said controlling means to display in real time the simulated operation of selected ones of said flame sources.

3. A simulation system according to claim 2 wherein said controlling means comprises a computer for supplying control signals to said video recorder to cause the display in real time of selected firebox images corresponding to the operation level of the simulated power plant.

4. A simulation system according to claim 3 further including a control console having a plurality of operation mode simulator switches for selecting a simulated operation level for said flame sources, said computer generating said control signals in response to the actuation of said operation mode simulator switches to cause a display in real time of simulated firebox images corresponding to a simulated operation mode selected by said actuation of said operation mode simulator switches.

5. A simulation system according to claim 1, further including
   means for recording said simulated firebox images for later use in said display means.

6. A simulation system according to claim 1 wherein said display of said simulated firebox images corresponds to normal plant transients of the simulated power plant.

7. A simulation system according to claim 1 wherein said display of said simulated firebox images corresponds to malfunctions in the simulated power plant.

8. A simulation system according to claim 1 wherein said display of said simulated firebox images corresponds to the actions or inactions by an operator on the simulated power plant.

9. A simulation system in real time for visually simulating a steam drum level indicator in a fossil fuel power plant having a water/steam level in a steam drum responsive to the operating condition of a simulated power plant comprising:
   means for generating simulated water/steam level images of the steam drum level corresponding to the water/steam level images of a particular fossil fuel power plant;
   means for displaying in real time simulated water/steam level images of the steam drum level indicator to display simulated levels of water/steam in the steam drum; and
   means for controlling said displaying means to display selected water/steam level images of the steam drum level indicator to simulate in real time the effect of changes in the operation level of the simulated power plant on the water/steam level in the steam drum.

10. A simulation system according to claim 9 wherein said displaying means comprises:
    a cathode ray tube; and
    a video recorder for storing a plurality of said water/steam level images indicating different levels of water/steam in said steam drum, said video recorder for supplying said stored images to said cathode ray tube under the control of said controlling means to display in real time the simulated water steam level in the steam drum.

11. A simulation system according to claim 10 wherein said controlling means comprises a computer for supplying control signals to said video recorder to cause the display in real time of selected water/steam level images corresponding to the operation level of the simulated power plant.

12. A simulation system according to claim 11 further including a control console having a plurality of operation mode simulator switches for selecting a simulated operation level for said steam drum, said computer generating said control signals in response to the actuation of said operation mode simulator switches to cause a display in real time of simulated water/steam level images corresponding to a simulated operation mode selected by said actuation of said operation mode simulator switches.

13. A simulation system according to claim 9 further including
    means for recording said simulated water/steam level images for later use in said displaying means.

14. A simulation system according to claim 9 wherein said display of said simulated water/steam level images of the steam drum level indicator corresponds to normal plant transients of the simulated power plant.

15. A simulation system according to claim 9 wherein said display of said simulated water/steam level images of the steam drum level indicator corresponds to malfunctions in the simulated power plant.

16. A simulation system according to claim 9 wherein said display of said simulated water/steam level images of the steam drum level indicator corresponds to the actions or inactions by an operator on the simulated power plant.

17. A simulation system in real time for visually simulating the emissions from a fossil fuel power plant comprising:
    means for generating simulated emission density images corresponding to the emission density images of a particular fossil fuel power plant;
    means for displaying in real time simulated emission density images of the fossil fuel plant at different levels of operation of a simulated power plant; and
    means for controlling said displaying means to display selected emission density images simulating in real time the effect of changes in the operation level of the simulated power plant on the emissions.

18. A simulation system according to claim 17 wherein the power plant includes a smokestack for discharging emissions and wherein said displaying means comprises:
   a cathode ray tube; and
   a video recorder for storing a plurality of sequence images of different densities of simulated emissions superimposed upon an image of said smokestack and for supplying said sequences of stored emission density images to said cathode ray tube under the control of said controlling means in accordance with the level of operation to display in real time the simulated emissions for the simulated power plant.

19. A simulation system according to claim 12 wherein said controlling means comprises a computer for supplying control signals to said video recorder to cause the display in real time of selected emission density images corresponding to the operation of the simulated power plant.

20. A simulation system according to claim 19 further including a control console having a plurality of operation mode simulator switches for selecting a simulated operation level of the power plant, said computer generating said control signals in response to the actuations of said operation mode simulator switches to cause a display in real time of simulated emission density images corresponding to a simulated operation mode selected by said actuation of said operation mode simulator switches.

21. A simulation system according to claim 17, further including
   means for recording said simulated emission density images for later use in said displaying means.

22. A simulation system according to claim 17 wherein said display of said simulated emission density images corresponds to malfunctions in the simulated power plant.

23. A simulation system according to claim 17 wherein said display of said simulated emission density images corresponds to normal plant transients of the simulated power plant.

24. A simulation system according to claim 17 wherein said display of said simulated emission density images corresponds to actions or inactions by an operator on the simulated power plant.

25. A simulation system in real time for a fossil fuel power plant including a smokestack and a firebox with a plurality of alternating levels of flame sources, the simulation system comprising:
   a first displaying means;
   a first video recorder for storing simulated firebox images corresponding to the firebox images of a particular fossil fuel power plant, the simulated firebox images including different ones of the flame sources being operative for different levels of operation of a simulated power plant and for supplying said stored firebox images to said first displaying means;
   means for controlling said first displaying means to display selected sequences of said stored simulated firebox images to show on said first displaying means real time simulated visual changes in the firebox corresponding to the changes of the simulated power plant from one operation level to another;
   a second displaying means; and
   a second video recorder for storing simulated emission density images corresponding to the emission density images of a particular fossil fuel power plant, the simulated emission density images being superimposed on an image of the smokestack, and for supplying said simulated emission density images to said second displaying means, said second video recorder device being controlled by said controlling means to supply to said displaying means the simulated emission density images to show on said second displaying means real-time simulated visual changes in the emission density corresponding to said simulated firebox images being displayed by said first displaying means and to the changes in the operation level of the simulated power plant.

26. A simulation system according to claim 25 wherein said fossil fuel power plant further includes a steam drum having a steam drum level indicator for indicating the water/steam level in the steam drum, and wherein the simulation system further comprises:
   a third displaying means; and
   a third video recorder for storing water/steam level images of the steam drum level indicator simulating different levels of water/steam within the steam drum of a particular fossil fuel power plant, said third video recorder for supplying said water/steam level images to said third displaying means in a sequence to simulate in real time the effect said simulated operation level of the power plant has on the water/steam level in the steam drum.

27. A simulation system according to claim 26 further including a control console having a plurality of switches for selecting the operation level of the power plant to be simulated.

28. A simulation system according to claim 27 wherein said controlling means comprises a simulation computer connected to said switches, said simulation computer for generating control signals to control said first, second and third video recorders to display in real time simulated firebox images, emission density images, and water/steam level images corresponding to said simulated operation levels of the simulated power plant as selected by said switches.

29. A simulation system according to claim 28 wherein said first, second and third displaying means each comprises a cathode ray tube.

30. A simulation system according to claim 29 wherein said first, second and third video recorders each comprises a video disc machine.

31. A method for visually simulating in real time a firebox of a fossil fuel power plant including a plurality of alternate levels of flame sources comprising the steps of:
   (a) generating selected video images of simulated firebox images corresponding to the firebox images of a particular fossil fuel power plant;
   (b) recording said simulated firebox images for later use in a display step;
   (c) displaying in real time sequences of said simulated firebox images including images of different operating levels and characteristics of the flame sources; and
   (d) controlling said display to display selected sequences of images to simulate in real time the operation of selected flame sources in the firebox of the simulated power plant.

32. A method for visually simulating in real time a steam drum level indicator of a fossil fuel power plant having a water/steam level indicator in a steam drum responsive to the operating condition of the simulated power plant comprising the steps of:
  (a) generating selected video images of simulated water/steam level images of the steam drum level indicator corresponding to the water/steam level images of a particular fossil fuel power plant;
  (b) recording said simulated water/steam level images of the steam drum level indicator for later use in a display step;
  (c) displaying in real time simulated water/steam level images of the steam drum level indicator to display simulated levels of water/steam in the steam drum; and
  (d) controlling said display to display selected water/steam level images of the steam drum level indicator to simulate in real time the effect of changes in the operation level of the power plant on the water/steam level in the steam drum.

33. A method for visually simulating in real time the emissions from a fossil fuel power plant comprising the steps of:
  (a) generating selected video images of simulated emission density images corresponding to the emission density images of a particular fossil fuel power plant;
  (b) recording said simulated emission density images for later use in the display step;
  (c) displaying in real time said simulated emission density images of the simulated power plant at different levels of operation of the plant; and
  (d) controlling said display to display selected emission density images simulating in real time the effect of changes in the operation level of the simulated power plant on the emissions.

* * * * *